United States Patent

Bailey et al.

(10) Patent No.: US 9,230,066 B1
(45) Date of Patent: Jan. 5, 2016

(54) ASSESSING RISK FOR THIRD-PARTY DATA COLLECTORS

(75) Inventors: Daniel V. Bailey, Pepperell, MA (US); Lawrence N. Friedman, Arlington, MA (US); Yedidya Dotan, Tel Aviv (IL)

(73) Assignee: EMC Corporation, Hopkinton, MA (US)

( * ) Notice: Subject to any disclaimer, the term of this patent is extended or adjusted under 35 U.S.C. 154(b) by 507 days.

(21) Appl. No.: 13/534,873

(22) Filed: Jun. 27, 2012

(51) Int. Cl.
*H04L 29/00* (2006.01)
*G06F 21/00* (2013.01)

(52) U.S. Cl.
CPC .................................... *G06F 21/00* (2013.01)

(58) Field of Classification Search
None
See application file for complete search history.

(56) References Cited

U.S. PATENT DOCUMENTS

| | | | |
|---|---|---|---|
| 8,214,634 B1 * | 7/2012 | Steele et al. | 713/152 |
| 8,255,971 B1 | 8/2012 | Webb et al. | |
| 8,453,226 B2 * | 5/2013 | Hammad | 726/9 |
| 8,505,103 B2 * | 8/2013 | Song et al. | 726/25 |
| 8,572,391 B2 | 10/2013 | Golan et al. | |
| 8,683,597 B1 | 3/2014 | Johansson et al. | |
| 2005/0137975 A1 * | 6/2005 | Williams | 705/40 |
| 2010/0024017 A1 * | 1/2010 | Ashfield et al. | 726/7 |
| 2011/0314549 A1 * | 12/2011 | Song et al. | 726/25 |

\* cited by examiner

*Primary Examiner* — Brandon Hoffman
*Assistant Examiner* — Helai Salehi
(74) *Attorney, Agent, or Firm* — BainwoodHuang

(57) ABSTRACT

An improved technique authenticates a user based on an ability to corroborate previous transaction data sent by a user device. Along these lines, the improved technique makes use of an independent information source for verifying the accuracy of previous transaction data obtained by a given collector. For example, when a collector of location data is a GPS unit of a cell phone, an independent information source may be a cell tower closest to the cell phone at the time of the transaction. While location data provided by the cell tower may not be as precise as that provided by the GPS unit, such data is useful for corroborating the location data from the GPS unit. In this scenario, if the data provided by the cell tower fails to corroborate that provided by the GPS unit, then the GPS unit adds significant risk to authenticating the user.

22 Claims, 5 Drawing Sheets

90

---

After completion of an authentication operation resulting in successful authentication of a user based on an initial value of a risk-based authentication factor from an electronic device, obtaining a corroborating value from an independent information source to corroborate the initial value of the risk based authentication factor
92

↓

Receiving an authentication request to authenticate the user, the authentication request including a new value of the risk-based authentication factor from the electronic device
94

↓

In response to the authentication request, authenticating the user based on (i) the new value of the risk-based authentication factor, (ii) the initial value of the risk-based authentication factor, and (iii) the corroborating value obtained from the independent information source
96

Figure 5

ASSESSING RISK FOR THIRD-PARTY DATA COLLECTORS

BACKGROUND

Some resource providers use risk-based authentication systems to process customer transactions. For example, an online bank may employ a risk engine of such a risk-based authentication system to assign risk scores to banking transactions where higher risk scores indicate higher risk.

A conventional risk-based authentication system assigns a risk score to a transaction based on data associated with the transaction. For example, suppose that a user initiates a transaction with an online bank through the user's cell phone. As part of the transaction request, the online bank may receive location data that was obtained with a GPS unit embedded in the cell phone. The online bank then sends the location data to the risk-based authentication system as part of a process of authenticating the user. The risk-based authentication system, in turn, assigns a risk score to the transaction based on this location data and previous location data associated with the user.

In some approaches, the conventional risk-based authentication system receives location data from the user, obtained with different devices. For example, in addition to the cell phone, the user may also use a laptop computer to log into a web site of the online bank over a WiFi network connection. The online bank would then receive location data obtained from the WiFi network connection in the form of an IP address. In addition, the conventional risk-based authentication system would assign a risk score to the transaction based on the value of the IP address as well as previous location data associated with the user.

SUMMARY

Unfortunately, there are deficiencies with the above-described conventional risk-based authentication systems. For example, risk scores assigned to a transaction by a conventional risk-based authentication system may fail to accurately reflect the risk associated with the transaction. Along these lines, consider the above-described example in which a GPS unit provides location data to a service provider as part of a user-initiated transaction. In some cases, the GPS unit itself may be infected with malware that sends false location data to the service provider. A conventional risk-based authentication system treats such false data as equally valid to any other location data it receives that is associated with the user that initiated the transaction.

Along these lines, suppose that a fraudster in Florida has a smartphone that was stolen from a bank customer in Massachusetts. Normally, if the fraudster were to attempt to access the customer's bank account from the smartphone, the GPS unit in the smartphone would register a location in Florida; a conventional risk-based authentication system would detect an attempt to access the account from Florida when such attempts are usually made from Massachusetts. The risk-based authentication system would assign a high risk score to such a transaction. On the other hand, if the fraudster was able to cause the GPS unit to spoof the bank customer's location in Massachusetts, then the risk-based authentication system would assign a low risk score to the transaction even though the transaction is fraudulent.

In contrast to conventional risk-based authentication systems that do not question the veracity of data associated with a transaction, an improved technique authenticates a user based on an ability to corroborate previous transaction data sent by a user device. Along these lines, the improved technique makes use of an independent information source for verifying the accuracy of previous transaction data obtained by a given collector. For example, when a collector of location data is a GPS unit of a cell phone, an independent information source may be a cell tower closest to the cell phone at the time of the transaction. While location data provided by the cell tower may not be as precise as that provided by the GPS unit, such data is useful for corroborating the location data from the GPS unit. In this scenario, if the data provided by the cell tower corroborates that provided by the GPS unit, then the GPS unit adds little or no additional risk to authenticating the user. If, on the other hand, the data provided by the cell tower fails to corroborate that provided by the GPS unit, then the GPS unit adds significant risk to authenticating the user.

It should be understood that, in addition to the corroboration data provided by the independent information source, the aggregate risk score also depends on the transaction data itself. Transaction data whose validity has been corroborated may still correspond to a risky transaction. In contrast, authentication systems in the improved technique consider as risky transactions having data whose validity cannot be corroborated.

Advantageously, the improved technique allows for a more accurate representation of the risk associated with authenticating a user. Such a representation may be encoded as an aggregate risk score in which corroboration data associated with previous transaction data quantifies the historical behavior of a collector of transaction data. A fraudulent user that may have been authenticated based on transaction data alone may not be authenticated because the transaction data could not be corroborated.

One embodiment of the improved technique is directed to a method of providing user authentication. The method includes, after completion of an authentication operation resulting in successful authentication of a user based on an initial value of a risk-based authentication factor from an electronic device, obtaining a corroborating value from an independent information source to corroborate the initial value of the risk-based authentication factor. The method also includes receiving an authentication request to authenticate the user, the authentication request including a new value of the risk-based authentication factor from the electronic device. The method further includes, in response to the authentication request, authenticating the user based on (i) the new value of the risk-based authentication factor, (ii) the initial value of the risk-based authentication factor, and (iii) the corroborating value obtained from the independent information source.

Additionally, some embodiments of the improved technique are directed to a system constructed and arranged to provide user authentication. The system includes a network interface, a memory, and a processor coupled to the memory, the processor configured to carry the method of providing user authentication.

Furthermore, some embodiments of the improved technique are directed to a computer program product having a non-transitory computer readable storage medium which stores code including a set of instructions to carry the method of providing user authentication.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

FIG. 1 is a block diagram illustrating an electronic environment for carrying out the improved technique.

FIG. 5 is a flow chart illustrating a method of carrying out the improved technique within the electronic environment shown in FIG. 1.

DETAILED DESCRIPTION

An improved technique authenticates a user based on an ability to corroborate previous transaction data sent by a user device. Along these lines, the improved technique makes use of an independent information source for verifying the accuracy of previous transaction data obtained by a given collector. For example, when a collector of location data is a GPS unit of a cell phone, an independent information source may be a cell tower closest to the cell phone at the time of the transaction. While location data provided by the cell tower may not be as precise as that provided by the GPS unit, such data is useful for corroborating the location data from the GPS unit. In this scenario, if the data provided by the cell tower corroborates that provided by the GPS unit, then the GPS unit adds little or no additional risk to authenticating the user. If, on the other hand, the data provided by the cell tower fails to corroborate that provided by the GPS unit, then the GPS unit adds significant risk to authenticating the user.

Advantageously, the improved technique allows for a more accurate representation of the risk associated with authenticating a user. Such a representation may be encoded as an aggregate risk score in which corroboration data associated with previous transaction data quantifies the historical behavior of a collector of transaction data. A fraudulent user that may have been authenticated based on transaction data alone may not be authenticated because the transaction data could not be corroborated.

Figure 1:
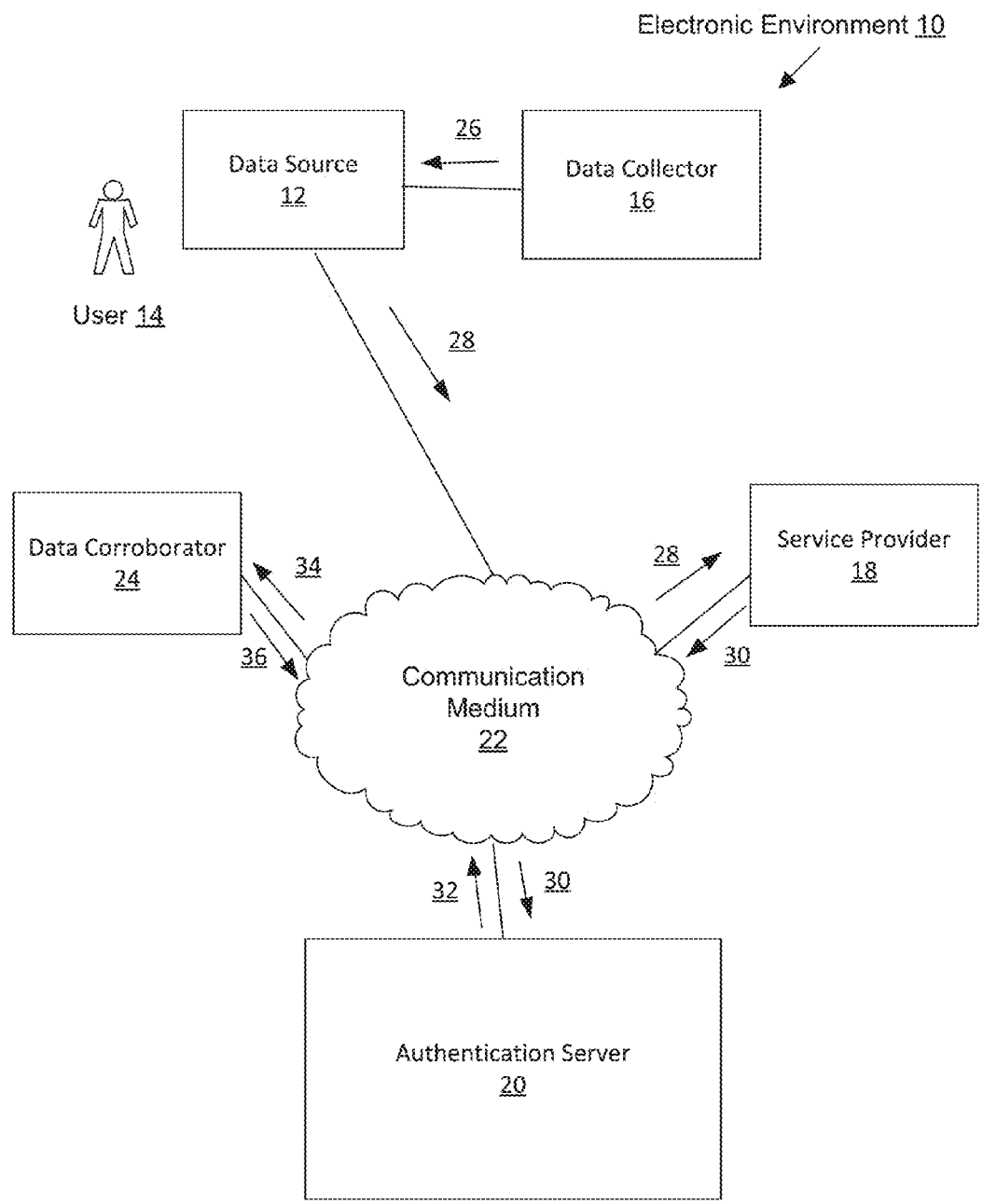

FIG. 1 illustrates an electronic environment 10 for carrying out the improved technique. Electronic environment 10 includes data source 12, data collector 16, service provider 18, authentication server 20, communication medium 22, and data corroborator 24.

Communication medium 22 provides network connections between data collector 16, service provider 18, authentication server 20, and data corroborator 24. Communications medium 22 may implement a variety of protocols such as TCP/IP, UDP, ATM, Ethernet, Fibre Channel, GPRS, EDGE, LTE, combinations thereof, and the like. Furthermore, communications media 12 may include various components (e.g., cables, switches/routers, gateways/bridges, NAS/SAN appliances/nodes, interfaces, etc.). Moreover, the communications medium 22 is capable of having a variety of topologies (e.g., queue manager-and-spoke, ring, backbone, multi drop, point to-point, irregular, combinations thereof, and so on).

Data source 12 is a device through which a user 14 initiates a transaction with service provider 18. In some arrangements, data source 12 is a smartphone. Data source 12, however, may take other forms including a personal computer, laptop computer, tablet computer, personal digital assistant, and the like.

Data collector 16 is associated with data source 12 and is constructed and arranged to obtain values of transaction parameters used in authenticating user 14 and sends those values to service provider 18. In some arrangements, data collector 16 is contained within a body of data source 12. Along these lines, data collector 16 may be a GPS unit contained within the body of a smartphone. In other arrangements, however, data collector 16 is physically separate from data source 12. In still further arrangements, data collector 16 may be an abstraction layer of a software system.

Service provider 18 is constructed and arranged to process transaction requests from user 14. Service provider 18 is a server that is capable of hosting a web site from which an electronic transaction 28 may be processed.

Authentication server 20 is constructed and arranged to generate an aggregate risk score from current transaction data, previous transaction data, and corroboration data associated with the previous transaction data. Further details regarding authentication server 20 will be described with respect to FIG. 2 below.

Data corroborator 24 is associated with data source 12 and is constructed and arranged to obtain, as previous corroboration data, values of transaction parameters used in corroborating previous transaction data and sends those values to authentication server 20.

During operation, user 14 initiates a transaction with service provider 18 over communication medium 22. The initiation is typically performed by opening a browser window that contains a web page associated with service provider 18. In the case of service provider 18 being a bank, the web page is a login page for the bank's web site. In some arrangements, the initiation also involves user 14 typing login credentials into the login page.

In the course of submitting login credentials to service provider 18, data collector 16 obtains transaction data 26 to be used for authenticating user 14. Along these lines, suppose that data source 12 is a smartphone, and data collector 16 is a GPS unit. Data collector 16 would then, under normal circumstances, obtain as transaction data 26 GPS coordinates that represent the location of the smartphone 12 (and, presumably, user 14). In some arrangements, however, GPS unit 16 is infected with malware and generates false coordinates as part of transaction data 26.

Data source 12 provides transaction data 26 within a transaction request 28 that it sends to service provider 18 over communication medium 22. In some arrangements, transaction request 28 takes the form of a set of data packets whose payload contains transaction data 26 and the login credentials identifying user 14.

Upon receiving transaction request 28, service provider 18 processes transaction request 28 to get details about an account belonging to user 14. Service provider 18 then generates an authentication request 30 in order to verify an authenticity of user 14. In some arrangements, authentication request 30 takes the form of a set of data packets whose payload contains transaction data 26 and other identifying data with respect to user 14.

Service provider 18 sends authentication request 30 to authentication server 20 over communication medium 22.

Upon receiving authentication request 30, authentication server 20 extracts identifying information and transaction data 26 from authentication request 30. From the identifying information, authentication server obtains previous transaction data associated with user 14. This previous transaction data takes the form of values of transaction parameters such as user location, transaction time, and transaction amount.

In addition, some time prior to receiving authentication request 30, authentication server 20 obtains corroboration data that verifies whether the previous transaction data was valid data. For example, when the previous transaction data includes location data obtained from the GPS unit 16 of the cell phone 12, the corroboration data takes the form of additional location data obtained from data corroborator 24 in the form of a nearby cell tower. Further details concerning the corroboration process for the case of user location data are discussed below with respect to FIG. 2.

Figure 2:
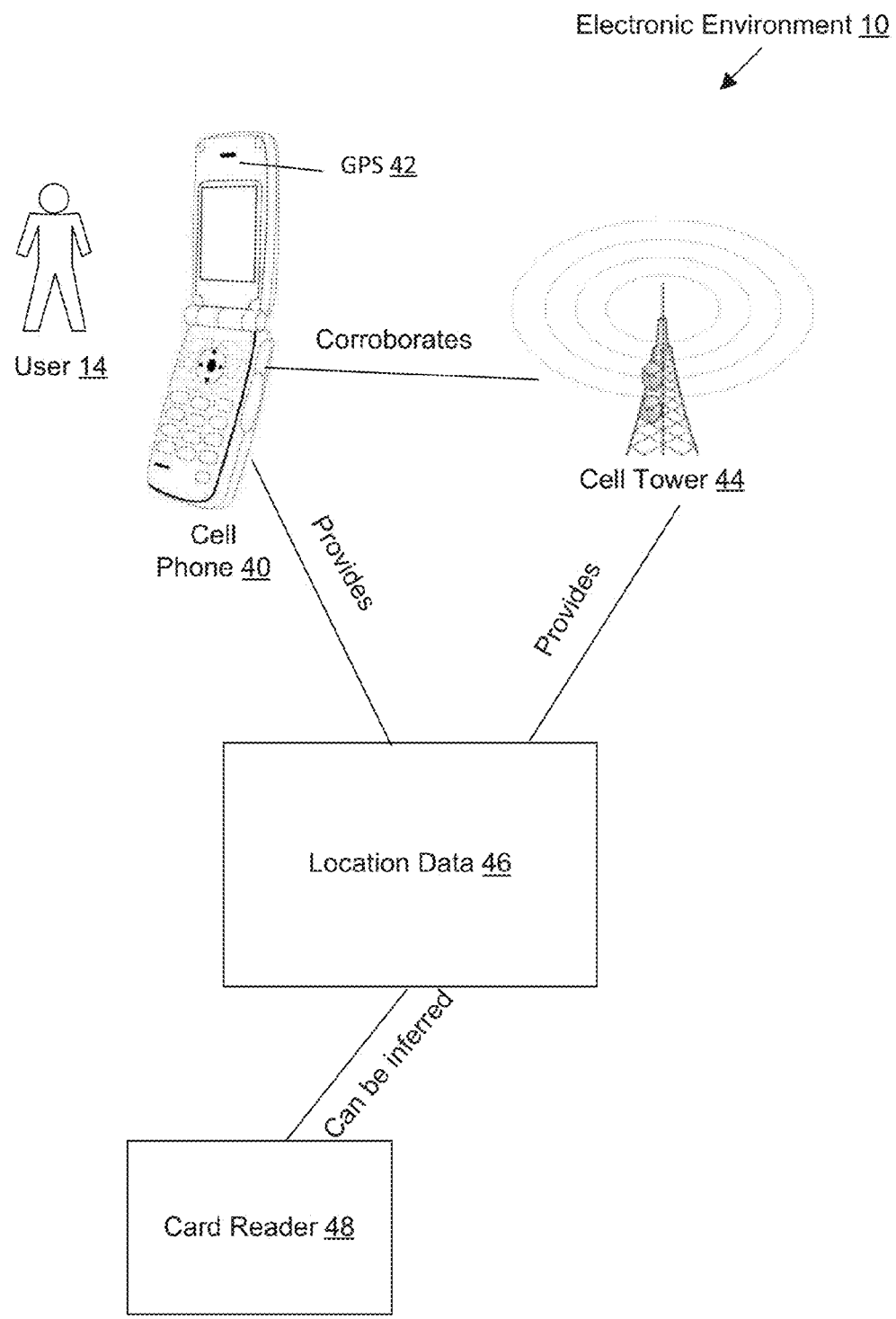
FIG. 2 is a block diagram illustrating an authentication server within the electronic environment shown in FIG. 1.

FIG. 2 illustrates an example corroboration scenario in which user 14 conducts a transaction with a service provider 18 (see FIG. 1) via cell phone 40. As discussed above, cell phone 40 gathers user location data 46 from GPS unit 42 as part of the login process. Nevertheless, an alternative collector of location data is a cell tower 44 in proximity to cell phone 40. Either GPS unit 42 or cell tower 44 may supply location data 46 as part of the login process.

Further, cell tower 44 can corroborate location data 46 from GPS unit 42. Along these lines, consider the example of the fraudster in Florida has a smartphone 40 that was stolen from a bank customer in Massachusetts. Suppose that the fraudster was able to cause the GPS unit to spoof the bank customer's location in Massachusetts in a previous transaction. Authentication server 20, as part of the authentication process, sends a request to corroborate the location data in the previous transaction to cell tower 44. In this case, cell tower 44 would indicate that the smartphone call that carried the previous transaction was made in Florida rather than Massachusetts. Because of the disagreement, authentication server 20 would indicate that new transactions having location data collected with GPS unit 42 have a high level of risk.

There are other ways of inferring location data 46. For example, suppose that user 14 goes to a nearby ATM and withdraws cash from an account via card reader 48. The location data 46 of the legitimate user may then be inferred from card reader 48.

Referring back to FIG. 1, authentication server 20 obtains corroboration data 36 by sending a corroboration data request 34 to data corroborator 24. In the case of corroborating data via cell tower 44 (see FIG. 2), authentication server 24 sends a request to an operator of cell tower 44 (e.g., Verizon Wireless, AT & T, etc.) to provide the location of the cell tower used to send transaction request 28 to service provider 18.

Once authentication server 20 obtains transaction data 26 via authentication request 30, previous transaction data, and previous corroboration data, authentication server 20 assigns to the transaction an aggregate risk score 32 indicative of a level of risk associated with the transaction. For example, if the previous corroboration data indicates that data collector 16 outputs false data, then authentication server 20 assigns a high risk score to the transaction.

Figure 3:
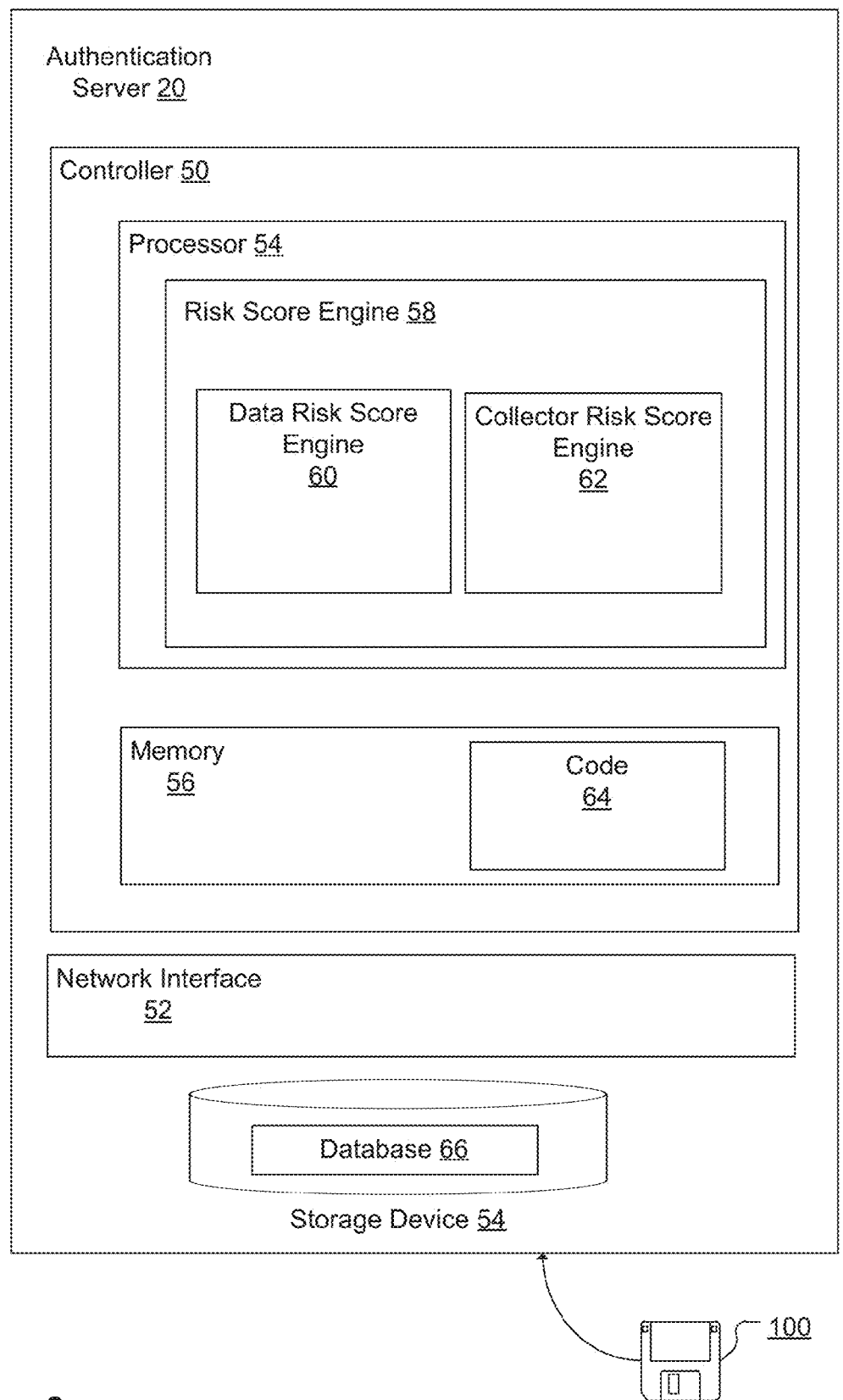
FIG. 3 is a schematic diagram illustrating a particular instance of carrying out the improved technique shown in FIG. 1.

Further details concerning authentication server 20 are considered with respect to FIG. 3.

FIG. 3 illustrates components of authentication server 20. Authentication server 20 includes a controller 50 which in turn includes processor 54 and memory 56, a network interface 52, and a storage device 54.

Memory 56 is configured to store code 64 which includes instructions to authenticate a user requesting a transaction with a service provider. Memory 56 generally takes the form of, e.g., random access memory, flash memory or a non-volatile memory.

Processor 54 takes the form of, but is not limited to, Intel or AMD-based Microprocessing Units, and can include a single or multi-cores each running single or multiple threads. Processor 54 is coupled to memory 56 and is configured to execute the code 64 stored in memory 56. Processor 54 includes risk score engine 58.

Network interface 52 is constructed and arranged to send and receive data over communication medium 22. Specifically, network interface 52 is configured to receive authentication request 30 from service provider 18 over communication medium 22 and to send authentication result 32 to service provider 18.

Storage device 54 includes database 66 in which previous transaction data and previous corroboration data are stored.

Risk score engine 58 is a processing unit constructed and arranged to generate aggregate risk scores from transaction data 26 (see FIG. 1), previous transaction data, and previous corroboration data. Risk score engine 58 may use either a rule-based schema or a model-based schema for generating an aggregate risk score from the inputs.

It should be understood that corroboration data for a transaction is typically obtained after the corresponding transaction has occurred. The process of obtaining corroboration data, in many cases, makes use of manual intervention and such data may be expensive. In this case, schemas for generating aggregate risk scores from corroboration data are statistical in nature.

In some arrangements, dependence of an aggregate risk score on the previous transaction data and dependence of the aggregate risk score on the previous corroboration data are decoupled. That is, the aggregate risk score may be split into two independent components: a data risk score and a collector risk score. To this effect, risk score engine 58 includes a data risk score engine 60 for generating a collector risk score, and a collector risk score engine 62 for generating a collector risk score. In some further arrangements, risk score engine 58 assigns as the aggregate risk score a combination of the data risk score and the collector risk score. For example, the collector risk score may be an input, along with the data risk score, into risk score engine 58 to obtain the aggregate risk score as output. In other arrangements, risk score engine 58 performs a statistical analysis on previous corroboration data to obtain the aggregate risk score as output. In such arrangements, the corroboration data is not used in the analysis when it is older than a Time-To-Live (TTL) parameter.

During operation, processor 54 sends, via network interface 52, a request 34 for corroboration data 36 to data corroborator 24 (see FIG. 1). Network interface 52 then receives corroboration data 36 and stores corroboration data 36 in database 66. Collector risk engine 62 receives a signal from processor 54 that corroboration data 36 has been received and that collector risk score engine 62 needs to adjust a configuration of collector risk score engine 62.

Along these lines, when the collector risk score generated by collector risk engine 62 is model-based, the collector risk score is characterized by a set of Bayesian weights. Each Bayesian weight corresponds to a particular data collector, such as a GPS unit or a cell tower in the case of location data. When corroboration data 36, in the form of a value of a transaction parameter, fails to verify the value of transaction parameter conveyed by the corresponding previous transaction data, collector risk engine 62 increases the value of the Bayesian weight corresponding to the particular data collector that generated the value of transaction parameter conveyed by the corresponding previous transaction data. Conversely, if corroboration data 36 succeeds in verifying the value of transaction parameter conveyed by the corresponding previous transaction data, collector risk engine 62 decreases the value of that Bayesian weight.

As an example, suppose that previous location data for user 14 stored in database 66 includes GPS coordinates taken from a GPS unit that indicate the transaction originated in Massachusetts. Corroboration data 36 from a cell tower includes the location of the cell tower from which that transaction originated and indicates that the location is in Florida. Because of this disagreement, collector risk engine 62 fails to verify the validity of the location data from the GPS unit and therefore increases the Bayesian weight corresponding to the GPS unit.

It should be understood that, while Bayesian weights for collector risk score engine are indicative of a level of trustworthiness of a data collecting entity, Bayesian weights for data risk engine correspond to transaction parameters such as user location, transaction time, and transaction amount. These weights are indicative of risk associated with values of the transaction parameters rather than the source of the values of the parameters.

In some arrangements, the Bayesian weights of collector risk engine 62 may also depend on a difference between the previous values of the transaction parameter and the corresponding corroborated values of the transaction parameter. Along these lines, consider the user location transaction parameter. If the corroboration data indicates a cell tower that is within 5 miles of the corresponding GPS data, then the transaction data has a high likelihood of being valid. Outside of a particular distance, say, 20 miles, the transaction data has a low likelihood of being valid. The values of the Bayesian weights may be adjusted to reflect such a dependence on this difference.

In other arrangements, processor 54 receives a message stating that a particular data collecting entity is on a black list indicating that the data collecting entity is untrustworthy. For example, such a message may take the form of an alert that a certain known set of GPS units were infected with malware known to produce spoofed location data. In such a scenario, collector risk engine 62 sets the collector risk score to a maximum collector risk score. In some arrangements, the maximum risk score would be configured to trigger more rigorous authentication procedures with respect to user 14.

The examples above used to illustrate the corroboration of transaction data discussed user location data and the various data collectors used to obtain such data. It should be understood, however, that other transaction parameters may be used in data corroboration. For example, transaction time is another such transaction parameter. An example system that corroborates transaction time is discussed below with respect to FIG. 4.

Figure 4:
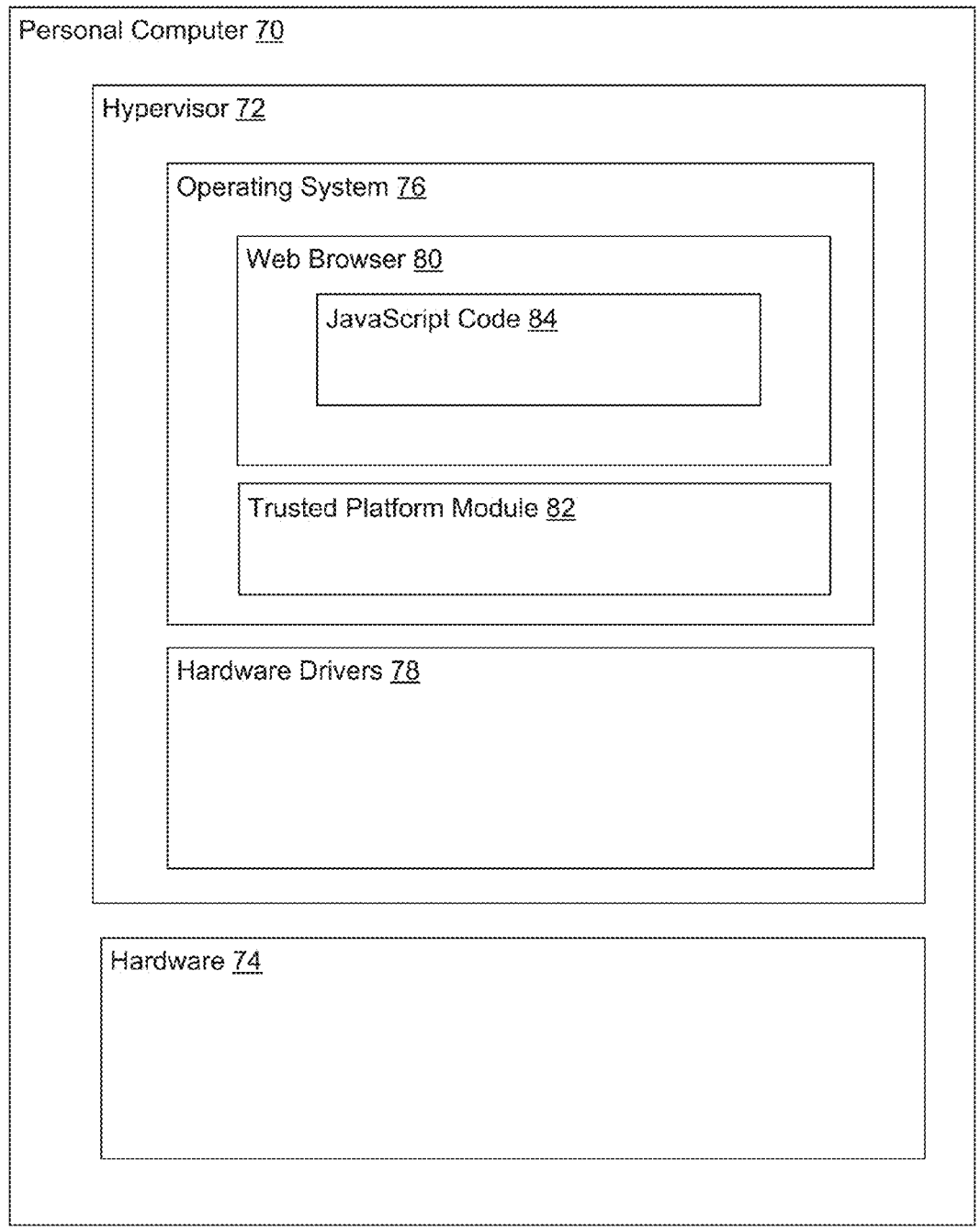
FIG. 4 is a schematic diagram illustrating another particular instance of carrying out the improved technique shown in FIG. 1.

FIG. 4 illustrates a personal computer 70 on which user 14 (see FIG. 1) conducts a transaction with service provider 18. Personal computer 70 includes a hypervisor 72 and hardware 74.

Hypervisor 72 is configured to manage communications between hardware 74 and the software instructions on which personal computer 70 runs. Hypervisor 72 includes an operating system 76 in which a web browser 80 runs. Hypervisor 72 also includes hardware drivers 78 through which communication with hardware 74 occurs.

Web browser 80 is software through which user 14 accesses the Internet and runs various software programs. Specifically, web browser 80 includes JavaScript code 84 that contains instructions for running the various software programs. For example, JavaScript code 84 is configured to report the time at which user 14 initiated the transaction with service provider 18.

Hypervisor 74, operating system 76, hardware drivers 78, and web browser 80 form particular abstraction layers within personal computer 70. Each abstraction layer provides a service to an abstraction layer above it. For example, hypervisor 72 provides services to operating system 76 and hardware drivers 78.

As with the GPS unit above, it is possible that a fraudster has installed malware on personal computer 70 in the form of JavaScript Code 84 that reports a spoofed transaction time. In such a scenario, authentication server 20 can obtain corroboration data 36 from any of the various abstraction layers within personal computer 70 that service Javascript Code 84. Because JavaScript Code 84 exists on an abstraction layer above those for hypervisor 74, operating system 76, hardware drivers 78, and web browser 80, authentication server 20 may obtain corroborating values of transaction times from any of these abstraction layers. For example, operating system 76 maintains an event log in which the sending of transaction request 28 to service provider 18 would be recorded. In this event log, the time at which the event took place would be recorded, and this recorded time would have been obtained by operating system 76 independently of JavaScript Code 84. This recorded time from the event log could then be used for corroboration data.

In some arrangements, personal computer 70 also includes a trusted platform module (TPM) 84; an example TPM is illustrated as being part of operating system 76, although the TPM may be included within other abstraction layers such as within web browser 80. The existence of a TPM is an attestation that certain parts of personal computer 70 have not been illicitly modified. Transaction data obtained within a TPM allows collector risk engine 62 (see FIG. 3) to set the collector risk score to zero or near zero.

FIG. 5 is a flow diagram illustrating a method 90 of authenticating a user requesting a transaction with a service provider. In step 92, current transaction data associated with the transaction is received from the service provider, the current transaction data being sent to the service provider by a data collecting entity. In step 94, an aggregate risk score is assigned to the transaction, the aggregate risk score being based on i) the current transaction data, ii) previous transaction data associated with the user, and iii) previous corroboration data verifying an accuracy of the previous transaction data sent to the service provider by the data collecting entity. In step 96, the aggregate risk score is sent to the service provider, the service provider authenticating the user based on the aggregate risk score.

While various embodiments of the invention have been particularly shown and described, it will be understood by those skilled in the art that various changes in form and details may be made therein without departing from the spirit and scope of the invention as defined by the appended claims.

For example, while the above examples illustrated corroboration of location and transaction time data, authentication server 20 can corroborate other transaction parameters as well. For example, evidence such as account type and account history, along with certain sensor information from a cell phone, may provide dependable verification of transaction data. Along these lines, suppose that service provider 18 receives a transaction request that includes sensor information. A collector for a service provider of the cell phone (e.g., Verizon, AT & T, etc.) has an existing business relationship with user 14. It is well known that prepaid cellular phone subscriptions are more commonly used by criminals than postpaid accounts, for which user 14 must provide identity documents and recurring payment instruments. By additionally providing information like "Account Type," the relying party may gain more confidence in the veracity of the sensor data.

Also, because customers log into accounts from any of multiple devices in their possession (e.g., tablets, PCs, smartphones, etc.), data collection entities running on such disparate devices can provide corroborating evidence about user 14 and the transaction. Along these lines, suppose that user authenticates to a bank using a PC for one transaction and then a tablet for another transaction. Data collection entities running on either device can share information. For example, the tablet and PC may be configured, or "paired," to share data with one another using a wireless technology like Bluetooth or Wi-Fi. The collectors could provide the time and date that the other device was "last seen." In the case that the tablet and PC are both in the same location at the same time, strong evidence is provided that neither device has been stolen. It is reasonable to assume that it is less likely that two devices will be stolen versus one device alone.

Further, it should be understood that, while the examples above discussed Bayesian weights being used in computing risk scores, other non-Bayesian likelihood metrics may be used.

Further, it should be understood that, while the examples above described corroboration of a user device such as a GPS in a cell phone, in some arrangements, corroboration may be performed on a generic electronic device such as a cell tower.

Furthermore, it should be understood that some embodiments are directed to authentication server 20 which is constructed and arranged to authenticate a user requesting a transaction with a service provider. Some embodiments are directed to adaptive authentication server 20. Some embodiments are directed to a system which authenticates a user requesting a transaction with a service provider. Some embodiments are directed to a process of authenticating a user requesting a transaction with a service provider. Also, some embodiments are directed to a computer program product which enables computer logic to authenticate a user requesting a transaction with a service provider.

In some arrangements, authentication server 20 is implemented by a set of processors or other types of control/processing circuitry running software. In such arrangements, the software instructions can be delivered to adaptive authentication engine 16 in the form of a computer program product 100 (FIG. 3) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of providing user authentication, the method comprising:
   after completion of an authentication operation resulting in successful authentication of a user based on an initial value of a risk-based authentication factor from an electronic device, obtaining, by processing circuitry, a corroborating value from an independent information source to corroborate the initial value of the risk-based authentication factor;
   receiving, by the processing circuitry, an authentication request to authenticate the user, the authentication request including a new value of the risk-based authentication factor from the electronic device; and
   in response to the authentication request, authenticating, by the processing circuitry, the user based on (i) the new value of the risk-based authentication factor, (ii) the initial value of the risk-based authentication factor, and (iii) the corroborating value obtained from the independent information source;
   wherein authenticating includes:
      obtaining, by the processing circuitry, an age of the corroboration value obtained from the independent information source;
      comparing, by the processing circuitry, the age of the corroboration value to a threshold to produce a comparison result indicating whether the corroboration value is too old to be used in authenticating the user;
      inputting, by the processing circuitry, (i) the new value of the risk-based authentication factor, (ii) the initial value of the risk-based authentication factor, and (iii) the corroborating value into a risk engine to produce a risk score in response to the comparison result indicating that the corroboration value is not too old to be used in authenticating the user; and
      inputting, by the processing circuitry, (i) the new value of the risk-based authentication factor and (ii) the initial value of the risk-based authentication factor into the risk engine to produce a risk score in response to the comparison result indicating that the corroboration value is too old to be used in authenticating the user.

2. A method according to claim 1, further comprising:
   prior to receiving the authentication request and authenticating the user in response to the authentication request, generating a collector risk score for the electronic device based on a difference between (i) the initial value of the risk-based authentication factor and (ii) the corroborating value obtained from the independent information source.

3. A method according to claim 1,
   wherein the initial value of the risk-based authentication factor and the corroborating value obtained from the independent information source are stored in a database that stores other values of the risk-based authentication factor and other corroborating values associated with the user;
   wherein authenticating the user in response to the authentication request includes:
   performing a statistical analysis on the initial value of the risk-based authentication factor, the corroborating value, the other values of the risk-based authentication factor, and the other corroborating values associated with the user.

4. A method according to claim 1, wherein the risk-based authentication factor is a location of the electronic device, wherein the electronic device includes a global positioning system (GPS) receiver, and
   wherein the independent information source is an apparatus of a cellular tower through which the authentication operation was carried out;
   wherein the method further comprises, prior to obtaining the corroborating value of the risk-based authentication factor, receiving as the initial value of the risk-based authentication factor a first value of the location of the electronic device from the GPS receiver;
   wherein obtaining the corroborating value includes receiving a second value of the location of the electronic device from a location of the cellular tower; and
   wherein receiving the authentication request to authenticate the user includes receiving a third value of the location of the electronic device from the GPS receiver.

5. A method according to claim 2 wherein authenticating the user includes:
   inputting (i) the new value of the risk-based authentication factor and (ii) the collector risk score into a risk score engine, and generating an aggregate risk score as an output of the risk score engine, the aggregate risk score indicating an overall level of risk that the user is fraudulent.

6. A method according to claim 2, wherein the electronic device is on a black list indicating that the electronic device is untrustworthy; and
wherein generating the collector risk score includes:
setting the collector risk score to a maximum collector risk score.

7. A method according to claim 3,
wherein each corroborating value includes a value of an elapsed time since being stored in the database;
wherein the database includes a value of a time-to-live (TTL) parameter; wherein
performing the statistical analysis includes:
eliminating, from the database, the corroborating value when the elapsed time of the corroborating value is greater than the value of the TTL parameter.

8. A method as in claim 4, further comprising computing a collector risk score for the GPS receiver based on a difference between (i) the first value of the location of the electronic device obtained from the GPS receiver and (ii) the second value of the location of the electronic device obtained from the location of the cellular tower.

9. A method according to claim 5,
wherein the risk score engine includes a collector risk score engine and a data risk score engine, the collector risk score engine being configured to produce the collector risk score, the data risk score being configured to produce a data risk score, the aggregate risk score being a combination of the collector risk score and the data risk score;
wherein generating the aggregate risk score includes:
producing the data-based risk score based on the new value of the risk-based authentication factor and the initial value of the risk-based authentication factor, and
generating, as the aggregate risk score, a combination of the data risk score and the collector risk score, the aggregate risk score indicating an overall level of risk that the user is fraudulent.

10. A method according to claim 5, further comprising:
providing an authentication result indicating (i) successful authentication when the aggregate risk score is less than a predetermined risk score threshold, and (ii) unsuccessful authentication when the aggregate risk score exceeds the predetermined risk score threshold.

11. A method according to claim 9,
wherein obtaining the corroborating value from the independent information source includes:
sending, to the independent information source, a request to provide the corroborating value, and
receiving, in response to the request, the corroborating value; and
wherein generating the collector risk score for the electronic device includes:
adjusting a configuration of the collector risk engine based on the corroborating value.

12. A method according to claim 11,
wherein the collector risk score engine includes a Bayesian weight corresponding to the electronic device; and
wherein adjusting the configuration of the collector risk score engine includes:
increasing a value of the Bayesian weight when the difference between the initial value of the risk-based authentication factor and the corroborating value obtained from the independent information source is larger than a threshold difference, and
decreasing a value of a Bayesian weight when the difference between the initial value of the risk-based authentication factor and the corroborating value obtained from the independent information source is smaller than a threshold difference.

13. A method according to claim 11,
wherein the electronic device includes a computing software system that includes a set of abstraction layers;
wherein receiving the authentication request to authenticate the user includes:
obtaining the new value of the risk-based authentication factor from a first abstraction layer of the set of abstraction layers of the computing software system;
wherein obtaining a corroborating value from the independent information source further includes:
obtaining the corroborating value from a second abstraction layer of the set of abstraction layers of the computing software system, the second abstraction layer being distinct from the first abstraction layer; and wherein sending the request to provide corroboration data includes:
providing the request to the computing software system, the request being directed to the second abstraction layer of the computing software system.

14. A method according to claim 13,
wherein the second abstraction layer includes a trusted platform module (TPM); and
wherein adjusting the configuration of the collector risk score engine includes:
assigning a value of zero to the collector risk score.

15. A system constructed and arranged to provide user authentication, the system comprising:
a network interface;
a memory; and
a controller which includes controlling circuitry coupled to the memory, the controlling circuitry being constructed and arranged to:
after completion of an authentication operation resulting in successful authentication of a user based on an initial value of a risk-based authentication factor from an electronic device, obtain a corroborating value from an independent information source to corroborate the initial value of the risk-based authentication factor;
receive an authentication request to authenticate the user, the authentication request including a new value of the risk-based authentication factor from the electronic device; and
in response to the authentication request, authenticate the user based on (i) the new value of the risk-based authentication factor, (ii) the initial value of the risk-based authentication factor, and (iii) the corroborating value obtained from the independent information source;
wherein the controlling circuitry constructed and arranged to authenticate is further constructed and arranged to:
obtain an age of the corroboration value obtained from the independent information source;
compare the age of the corroboration value to a threshold to produce a comparison result indicating whether the corroboration value is too old to be used in authenticating the user;
input (i) the new value of the risk-based authentication factor, (ii) the initial value of the risk-based authentication factor, and (iii) the corroborating value into a risk engine to produce a risk score in response to the comparison result indicating that the corroboration value is not too old to be used in authenticating the user; and input (i) the new value of the risk-based authentication factor and (ii) the initial value of the risk-based authentication factor into the risk engine to produce a risk score in response to the comparison result indicating that the corroboration value is too old to be used in authenticating the user.

16. A system according to claim 15 wherein the controlling circuitry is further constructed and arranged to:

prior to receiving the authentication request and authenticating the user in response to the authentication request, generate a collector risk score for the electronic device based on a difference between (i) the initial value of the risk-based authentication factor and (ii) the corroborating value obtained from the independent information source.

17. A system according to claim 16 wherein authenticating the user includes:

inputting (i) the new value of the risk-based authentication factor and (ii) the collector risk score into a risk score engine, and generating an aggregate risk score as an output of the risk score engine, the aggregate risk score indicating an overall level of risk that the user is fraudulent.

18. A system according to claim 17, wherein the risk score engine includes a collector risk score engine and a data risk score engine, the collector risk score engine being configured to produce the collector risk score, the data risk score being configured to produce a data risk score, the aggregate risk score being a combination of the collector risk score and the data risk score;

wherein generating the aggregate risk score includes:

producing the data-based risk score based on the new value of the risk-based authentication factor and the initial value of the risk-based authentication factor, and generating, as the aggregate risk score, a combination of the data risk score and the collector risk score, the aggregate risk score indicating an overall level of risk that the user is fraudulent.

19. A system according to claim 18, wherein obtaining the corroborating value from the independent information source includes:

sending, to the independent information source, a request to provide the corroborating value, and receiving, in response to the request, the corroborating value; and wherein generating the collector risk score for the electronic device includes:

adjusting a configuration of the collector risk engine based on the corroborating value.

20. A system according to claim 19, wherein the collector risk score engine includes a Bayesian weight corresponding to the electronic device; and wherein adjusting the configuration of the collector risk score engine includes:

increasing a value of the Bayesian weight when the difference between the initial value of the risk-based authentication factor and the corroborating value obtained from the independent information source is larger than a threshold difference, and decreasing a value of a Bayesian weight when the difference between the initial value of the risk-based authentication factor and the corroborating value obtained from the independent information source is smaller than a threshold difference.

21. A computer program product having a non-transitory, computer-readable storage medium which stores code to provide user authentication, the code including instructions to:

after completion of an authentication operation resulting in successful authentication of a user based on an initial value of a risk-based authentication factor from an electronic device, obtain a corroborating value from an independent information source to corroborate the initial value of the risk-based authentication factor;

receive an authentication request to authenticate the user, the authentication request including a new value of the risk-based authentication factor from the electronic device; and in response to the authentication request, authenticate the user based on (i) the new value of the risk-based authentication factor, (ii) the initial value of the risk-based authentication factor, and (iii) the corroborating value obtained from the independent information source;

wherein the code including instructions to authenticate further includes instructions to:

obtain an age of the corroboration value obtained from the independent information source;

compare the age of the corroboration value to a threshold to produce a comparison result indicating whether the corroboration value is too old to be used in authenticating the user;

input (i) the new value of the risk-based authentication factor, (ii) the initial value of the risk-based authentication factor, and (iii) the corroborating value into a risk engine to produce a risk score in response to the comparison result indicating that the corroboration value is not too old to be used in authenticating the user; and input (i) the new value of the risk-based authentication factor and (ii) the initial value of the risk-based authentication factor into the risk engine to produce a risk score in response to the comparison result indicating that the corroboration value is too old to be used in authenticating the user.

22. A computer program product according to claim 21 wherein the code includes further instructions to:

prior to receiving the authentication request and authenticating the user in response to the authentication request, generate a collector risk score for the electronic device based on a difference between (i) the initial value of the risk-based authentication factor and (ii) the corroborating value obtained from the independent information source.

* * * * *